United States Patent
Lee et al.

(10) Patent No.: US 7,044,822 B2
(45) Date of Patent: May 16, 2006

(54) METHOD OF MANUFACTURING A FIELD EMISSION DEVICE UTILIZING THE SACRIFICIAL LAYER

(75) Inventors: Jeong-Hee Lee, Gyeonggi-do (KR); Hang-Woo Lee, Gyeonggi-do (KR); Shang-Hyeun Park, Chungcheongnam-do (KR); You-Jong Kim, Seoul (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 131 days.

(21) Appl. No.: 10/735,741

(22) Filed: Dec. 16, 2003

(65) Prior Publication Data

US 2004/0124756 A1 Jul. 1, 2004

(30) Foreign Application Priority Data

Dec. 20, 2002 (KR) .................. 10-2002-0081865
Mar. 12, 2003 (KR) .................. 10-2003-0015360

(51) Int. Cl.
*H01J 9/04* (2006.01)

(52) U.S. Cl. .......................... 445/50; 445/51
(58) Field of Classification Search ............ 313/49–51; 445/49–51

See application file for complete search history.

(56) References Cited

U.S. PATENT DOCUMENTS

| | | | | |
|---|---|---|---|---|
| 5,769,679 A | * | 6/1998 | Park et al. ................ 445/50 |
| 6,084,245 A | * | 7/2000 | Hsu et al. ................. 257/10 |
| 6,096,570 A | * | 8/2000 | Hattori .................... 438/20 |
| 6,168,491 B1 | * | 1/2001 | Hsu et al. ................. 445/24 |
| 6,297,587 B1 | * | 10/2001 | Kikuchi et al. ............ 313/495 |
| 6,339,281 B1 | | 1/2002 | Lee et al. |
| 6,440,761 B1 | | 8/2002 | Choi |
| 6,440,763 B1 | * | 8/2002 | Hsu .................... 438/20 |
| 6,465,941 B1 | * | 10/2002 | Kubota et al. ............ 313/309 |
| 6,815,238 B1 | * | 11/2004 | Lee et al. ............... 438/20 |
| 6,819,041 B1 | * | 11/2004 | Kajiwara ................ 313/496 |
| 6,924,158 B1 | * | 8/2005 | Syms .................... 438/20 |

FOREIGN PATENT DOCUMENTS

| KR | 7-14500 | 1/1995 |
|---|---|---|
| KR | P2001-35361 A | 2/2001 |
| KR | P2001-0046796 | 6/2001 |

OTHER PUBLICATIONS

Office Action issued by the Korean Patent Office on Feb. 28, 2005 in corresponding application.

* cited by examiner

*Primary Examiner*—Joseph Williams
*Assistant Examiner*—Dalei Dong
(74) *Attorney, Agent, or Firm*—Buchanan Ingersoll PC

(57) ABSTRACT

A substrate, a cathode electrode formed on the substrate, a gate insulating layer which is formed on the cathode electrode and has a through hole corresponding to part of the cathode electrode, a gate electrode which has a gate hole corresponding to the through hole and is formed on the gate insulating layer, and an emitter formed on the gate electrode exposed to the bottom of the through hole. The emitter has a stack structure formed of a resistive material layer and an electron emission material layer containing a fine electron emission source formed on the resistive material layer.

37 Claims, 14 Drawing Sheets

US 7,044,822 B2

METHOD OF MANUFACTURING A FIELD EMISSION DEVICE UTILIZING THE SACRIFICIAL LAYER

BACKGROUND OF THE INVENTION

This application claims the priority of Korean Patent Application Nos. 2002-81865, filed on Dec. 20, 2002 and 2003-15360, filed on Mar. 12, 2003, in the Korean Intellectual Property Office, the disclosure of which is incorporated herein in its entirety by reference.

1. Field of the Invention

The present invention relates to a field emission device and a method of manufacturing the same, and more particularly, to a field emission device in which the stability and uniformity of electron emission are improved, and a method of manufacturing the same.

2. Description of the Related Art

Carbon nanotube (CNT) performs field emission even at a very low voltage due to their small diameter and sharp end and has physical characteristics similar to fullerene ($C_{60}$). Since they have an excellent electron emission characteristic and chemical and mechanical durability, their physical properties and applications have steadily been studied. A Spindt-type field emitter uses a micro-tip as an emitter for emitting electrons. The emitter has a problem in that the life span of a micro-tip is shortened due to atmosphere gases or a non-uniform field during a field emission operation. In addition, with such conventional metal emitter, a work function must be decreased to decrease a driving voltage for field emission, but there are limitations. To overcome this problem, a field emission array (FEA) using carbon nanotubes which have a substantially high aspect ratio, an excellent durability due to their structure similar to that of $C_{60}$, and an excellent electron conductivity as an electron emission source have been studied.

A field emission array (FEA) using an electron emission material mixture paste and a method of manufacturing the same are disclosed in U.S. Pat. No. 6,440,761. A field emission array using CNTs manufactured by growth as an emitter and a method of manufacturing the same are disclosed in U.S. Pat. No. 6,339,281. In general, it is easier to form the emitter using a paste than by growth. Thus, the former method disclosed in U.S. Pat. No. 6,440,761 is generally preferred.

A CNT emitter formed by these conventional methods is formed on a cathode or a high conductivity material layer formed on the cathode. FIG. 1 shows a traditional example of a conventional triode-type CNT FEA.

Referring to FIG. 1, a cathode electrode 2 is formed on a substrate 1, and a gate insulating layer 3 is formed on the cathode electrode 2. A through hole 3a is formed on the gate insulating layer 3 and a CNT emitter 5 formed of a plurality of CNTs is provided on the bottom of the through hole 3a. The CNT emitter 5 is formed on the cathode electrode 2 exposed to the bottom of the through hole 3a. A gate electrode 4 having a gate hole 4a through which electrons are extracted from the CNT emitter 5 is formed on the gate insulating layer 3.

The CNT FEA has the advantage of achieving electron emission from the entire emitter, unlike in the Spindt-type field emission emitter using a micro-tip. As such, a large amount of electron emission can be achieved. However, actually, electron emission is not performed in the entire emitter but is intensively performed only in part of CNTs. Due to intensive electron emission caused by these CNTs, the uniformity of electron emission and current density are lowered. The uniformity of electron emission and the current density affect the degree of brightness and uniformity of a screen in an image display. The CNT emitter is formed of a paste containing a CNT and a photosensitive resin. A resistive material and a conductive material are mixed with the paste such that electrons are emitted from a front end of a CNT 5a, as shown in FIG. 1. In this case, the FEA has a problem in that current is supplied to the CNT 5a through many conductive paths and electron emission is actually performed only in part of CNTs. Due to electron emission from the limited CNTs, partial overcurrent is generated in the CNT emitter. Thus, the CNTs where electron emission occurs rapidly wear and are damaged. Due to the damage of the CNT, picture quality is lowered, and the life span of the FEA is shortened.

SUMMARY OF THE INVENTION

The present invention provides a field emission array (FEA) in which electrons are uniformly emitted from a carbon nanotube (CNT) emitter and an image with good picture quality is embodied, and a method of manufacturing the same.

According to one aspect of the present invention, there is provided a field emission device. The field emission device includes a substrate, a cathode electrode formed on the substrate, a gate insulating layer which is formed on the cathode electrode and has a through hole corresponding to part of the cathode electrode, a gate electrode which has a gate hole corresponding to the through hole and is formed on the gate insulating layer, and an emitter formed on the gate electrode exposed to the bottom of the through hole. The emitter has a stack structure formed of a resistive material layer and an electron emission material layer containing a fine electron emission source formed on the resistive material layer.

According to an embodiment of the present invention, the electron emission material layer includes one of carbon nanotubes and nano particles, and the electron emission material layer includes a conductive material.

According to an embodiment of the present invention, the conductive material includes silver (Ag).

According to another aspect of the present invention, there is provided a method of manufacturing a field emission device. The method comprises (a) preparing a substrate structure in which a cathode electrode formed on a substrate, a gate insulating layer having a through hole through which part of the cathode electrode is exposed formed on the cathode electrode, and a gate electrode having a gate hole corresponding to the through hole formed on the gate insulating layer are sequentially stacked, (b) forming a sacrificial layer on the surface of the substrate structure and on an inner wall of the through hole other than the cathode electrode exposed to the bottom of the through hole, (c) coating a resistive material on the surface of the substrate structure to a predetermined thickness, covering the through hole with the resistive material, and forming an electron emission material layer on the resistive material layer, (d) performing lift-off for removing the sacrificial layer formed on the surface of the gate electrode and on an inner wall of the through hole using an etchant and forming an emitter formed of the resistive material layer and the electron emission material layer formed on the resistive material layer in an inner portion of the through hole, and (e) firing the emitter.

In the method of manufacturing a field emission device according to the present invention, the resistive material layer is formed of one of a paste, a Sol-gel, or a slurry solution, and the electron emission material layer includes a conductive material and is formed of one of a paste, a Sol-gel, or a slurry solution. Preferably, the conductive material is silver (Ag).

According to an embodiment of the present invention, the electron emission material layer and the resistive material layer include a photoimageable resin.

According to another aspect of the present invention, there is provided a method of manufacturing a field emission device. The method comprises (a) preparing a substrate structure in which a cathode electrode formed on a substrate, a gate insulating layer having a through hole through which part of the cathode electrode is exposed formed on the cathode electrode, and a gate electrode having a gate hole corresponding to the through hole formed on the gate insulating layer are sequentially stacked, (b) forming a sacrificial layer on the surface of the substrate structure and on an inner wall of the through hole other than the cathode electrode exposed to the bottom of the through hole, (c) forming an isolation layer that prevents contact between an electron emission material used to form an emitter on the gate electrode and the sacrificial layer, (d) coating the electron emission material on the surface of the substrate structure on which the sacrificial layer is formed, to a predetermined thickness and forming an electron emission material layer for burying the through hole with the electron emission material, (e) performing lift-off for removing the sacrificial layer formed on the surface of the gate electrode and on an inner wall of the through hole using an etchant, removing the isolation layer formed on the sacrificial layer and the electron emission material, and forming an emitter formed of the electron emission material layer in an inner portion of the through hole, and (f) firing the emitter.

In the method of manufacturing a field emission device, the electron emission material includes a conductive material and is formed of one of a paste, a Sol-gel, or a slurry solution. Preferably, the conductive material is silver (Ag).

Preferably, the electron emission material includes one of carbon nanotubes or nano particles. More preferably, the conductive material includes silver (Ag), and the isolation layer includes a resistive material.

Meanwhile, preferably, the isolation layer is formed of one of a paste, a Sol-gel, or a slurry solution. Also, preferably, the electron emission material includes a conductive material and is formed of one of a paste, a Sol-gel, or a slurry solution.

According to an embodiment of the present invention, the electron emission material layer and the resistive material layer include a photoimageable resin. Preferably, the sacrificial layer is formed of a photoresist, and the isolation layer is formed using a solution where polyvinyl alcohol is added to an IPA diluted solution IPA/$H_2O$, and the resistive material layer includes at least one of $SiO_2$, MgO, a-Si, and p-Si.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Figure 1:
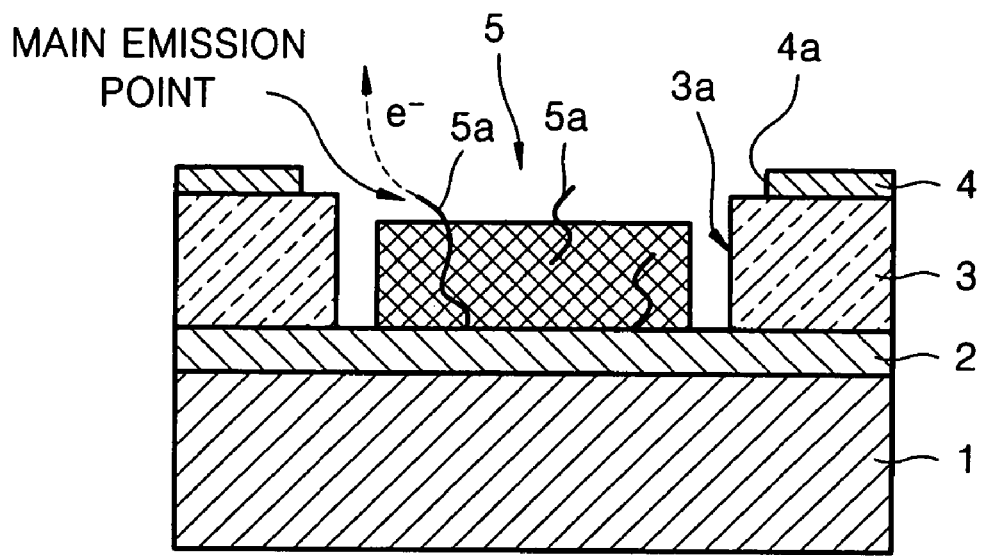
FIG. 1 is a cross-sectional view schematically illustrating a conventional field emission device.
Figure 2:
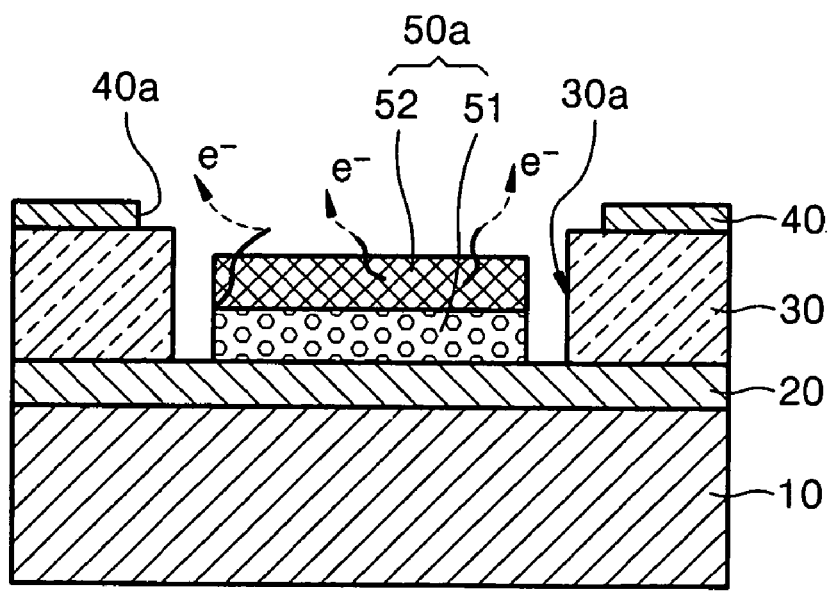
FIG. 2 is a cross-sectional view schematically illustrating a field emission device according to the present invention.

Referring to FIG. 2, a cathode electrode 20 is formed on a substrate 10, and a gate insulating layer 30 is formed on the cathode electrode 20. A through hole 30a through which a carbon nanotube (CNT) emitter which will be described later, is received, is formed in the gate insulating layer 30, and an emitter 50 for emitting electrons is provided on the bottom of the through hole 30a. The emitter 50 is formed on the cathode electrode 20 exposed to the bottom of the through hole 30a. Here, the emitter 50 has a stack structure in which a lower resistive material layer 51 and an upper electron emission material layer 52 are sequentially formed. Meanwhile, a gate electrode 40 having a gate hole 40a through which electrons are extracted from the electron emission material layer 52 of the emitter 50, is formed on the gate insulating layer 30.

The electron emission material layer 52 includes CNTs or nano-sized particles which can emit electrons under a predetermined electric field. Also, preferably, for more effective current supply, metal particles with high conductivity, i.e., silver (Ag) are contained in the electron emission material layer 52.

According to the field emission device having the above structure, as shown in FIG. 2, the resistive material layer 51 is formed under the electron emission material layer 52 such that current is uniformly supplied to emission points (ends) of CNTs or nano particles uniformly distributed over the electron emission material layer 52 with a high conductivity caused by a conductive particle such as Ag and electrons e$^-$ are uniformly emitted to the entire area of the emitter.

Hereinafter, a method of manufacturing the field emission device according to a first embodiment of the present invention will be described.

Figure 3A:
FIGS. 3A through 3C are process diagrams illustrating the step of forming a substrate structure which is the basis of the field emission device according to the present invention.

As shown in FIG. 3A, a cathode electrode 20 is formed on a substrate 10 formed of soda lime glass. The cathode electrode 20 is formed of indium tin oxide (ITO) and is patterned by photolithography.

Figure 3B:
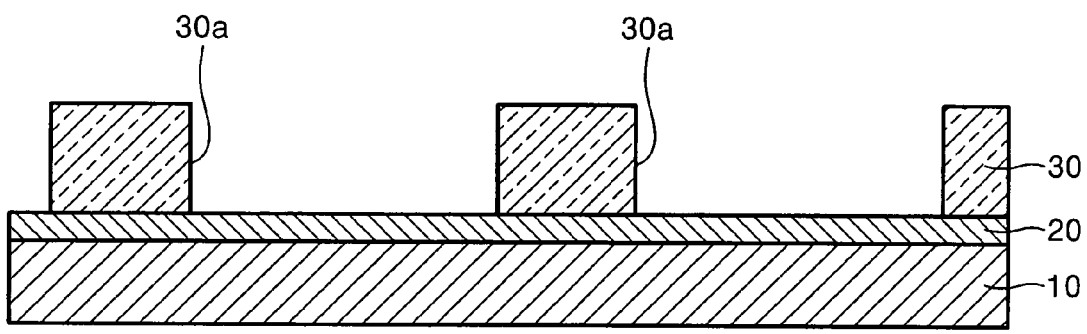

As shown in FIG. 3B, a gate insulating layer 30 is formed on the substrate 10. The gate insulating layer 30 has a through hole 30a through which part of the cathode electrode 20 is exposed. The gate insulating layer 30 may be formed by screen printing or other well-known methods.

Figure 3C:
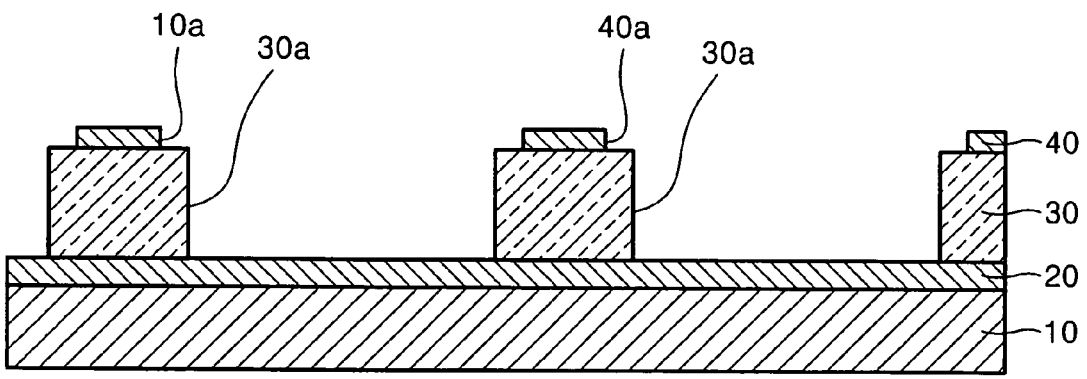

As shown in FIG. 3C, a gate electrode 40 is formed on the gate insulating layer 30. The gate electrode 40 has a gate hole 40a corresponding to the through hole 30a and is formed by depositing and patterning of a metal material or screen printing of a metal paste using a thin film process or a thick film process.

Processes for obtaining a substrate structure shown in FIG. 3C as shown in FIGS. 3A through 3C are well known, and the substrate structure may be formed using methods other than the above-mentioned methods. The following processes succeed to the above processes and include the following steps by which the present invention is characterized. FIGS. 4A through 4F show an extracted structure corresponding to one emitter and a gate hole.

Figure 4A:
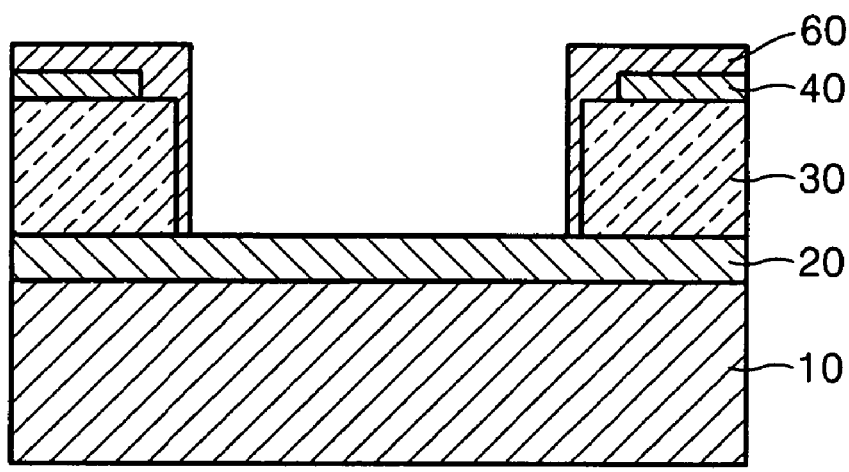
FIGS. 4A through 4F are process diagrams illustrating the step of forming an electron emitter on the substrate structure according to a first embodiment of the present invention.

As shown in FIG. 4A, a sacrificial layer 60 for achieving lift-off is formed of a photoresist on a surface of the gate electrode 40 and on an inner wall of the through hole 30a other than the bottom of the through hole 30a.

Figure 4B:
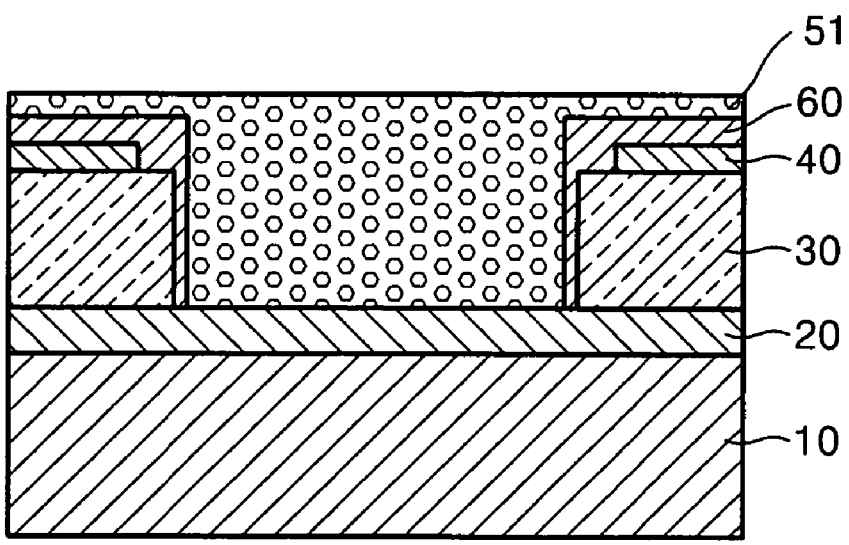

As shown in FIG. 4B, a resistive material layer 51 containing the photoresist is formed on the sacrificial layer 60 by screen printing using a paste or spin coating using a Sol-gel or a slurry solution. The resistive material layer 51 covers inside of the through hole 30a during coating.

Figure 4C:
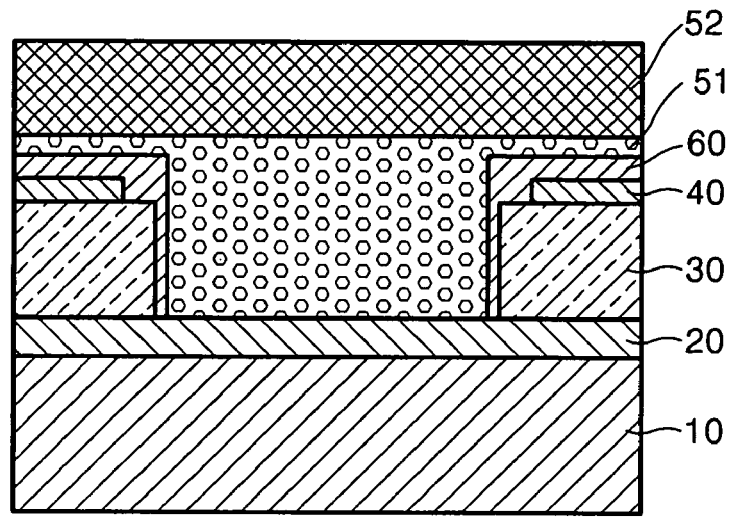

As shown in FIG. 4C, an electron emission material layer 52 in a paste state containing a photoimageable resin and a material where electron emission can be achieved, for example, CNT or nano particles, is formed on the resistive material layer 51.

Conductive particles for effective current supply, for example, silver (Ag) is contained in the paste.

Figure 4D:
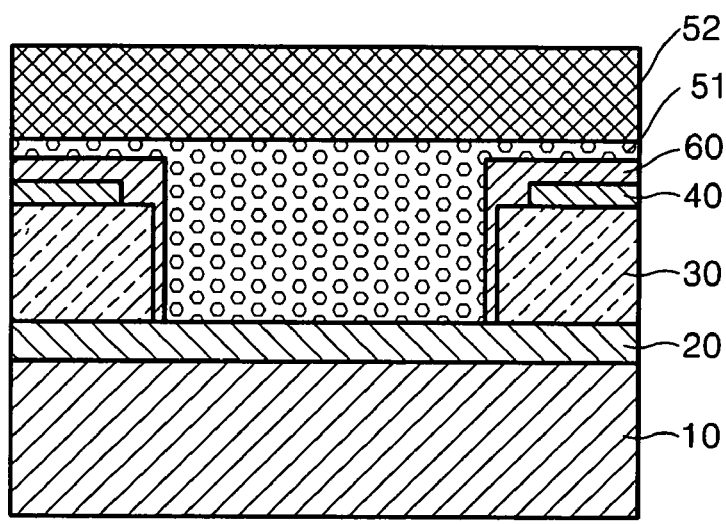
Figure 4D:

As shown in FIG. 4D, the resistive material layer 51 and the electron emission material layer 52 are cured by heating or using ultraviolet (UV) rays.

Figure 4E:
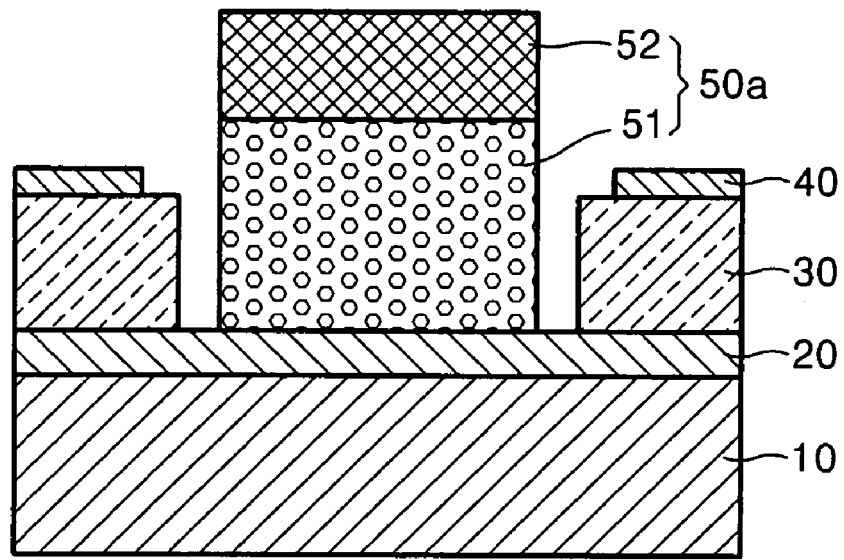

As shown in FIG. 4E, lift-off of removing the sacrificial layer 60 is performed using an etchant, and thus, an initial-shaped emitter 50 is formed by the resistive material layer 51 and the electron emission material layer 52 only in the bottom center of the through hole 30a.

Figure 4F:
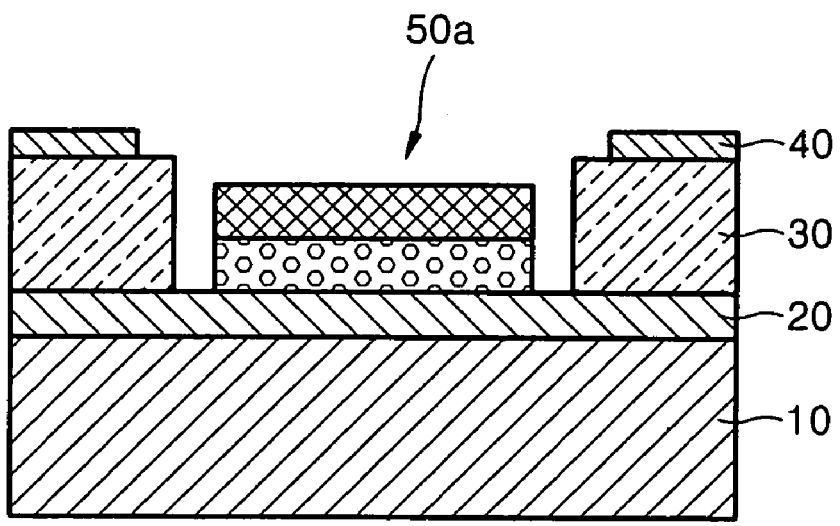

As shown in FIG. 4F, the emitter 50 is fired at a predetermined temperature, completely cured, and contracted. Thus, the electron emission material layer 52 is gone down to a lower portion of the gate hole 40a, and a desired field emission device is manufactured.

As described above, the present invention is characteristic in that the emitter has a stack structure formed of a resistive material layer for limiting current and an electron emission material layer where electron emission is performed. According to this structure, that is, the field emission device according to the present invention includes an emitter using the characteristics of a conductive material and a resistive material. According to this structure, unlike in the conventional field emission device in which current is supplied to emission points of the electron emission material layer through several limited paths, the resistive material layer is formed on a lower current path of the electron emission material layer such that current is uniformly supplied by electrons passing the resistive material layer to the electron emission material layer with a high conductivity and smoothly supplied to a plurality of emission points.

Meanwhile, even after the emitter 50 is formed by lifting off the electron emission material layer 52 and the lower resistive material layer 51, part of the electron emission material may remain around the gate hole 40a. The unnecessary electron emission material may cause electrical short circuit between the emitter 50 and the gate electrode 40, and thus has to be removed.

The remain of the electron emission material may be generated by chemical combination of the resistive material layer and the sacrificial layer. That is, due to the contact between the sacrificial layer and the electron emission material layer which may occur during a field emission device manufacturing process, there is a very high possibility that they react to each other. This is because the two materials are formed of a resin containing a photosensitive material. A resin that can be used as the sacrificial layer is a Novolac-family photosensitive resin. When a solvent having a high solubility with respect to the resin formed of this component, for example, Texanol, is added to the field emission material, the attack of the solvent against the sacrificial layer is inevitable. That is, due to the contact between the two layers, Texanol with a high solubility melts Novolac matrix of the sacrificial layer, which leads that the solved Novolac matrix is mixed with an acrylic matrix existing in the electron emission material layer such that strong combination between two matrices is induced. In this case, patterning of the emitter using a developing agent or a solvent for lift-off is not possible. Thus, in the method of manufacturing a field emission device according to a second embodiment of the present invention, the aforementioned resistive material layer has a role of an isolation layer for preventing contact between the material used as the sacrificial layer and the electron emission material layer used to form an emitter, and a nonreactive material which will be described later, is contained in the resistive material layer.

Other methods for effectively preventing remaining of the electron emission material will be described in the following embodiments. Even in the second embodiment of the present invention, first, a substrate structure is prepared using the processes shown in FIGS. 3A through 3C, and the following processes are performed.

Figure 5A:
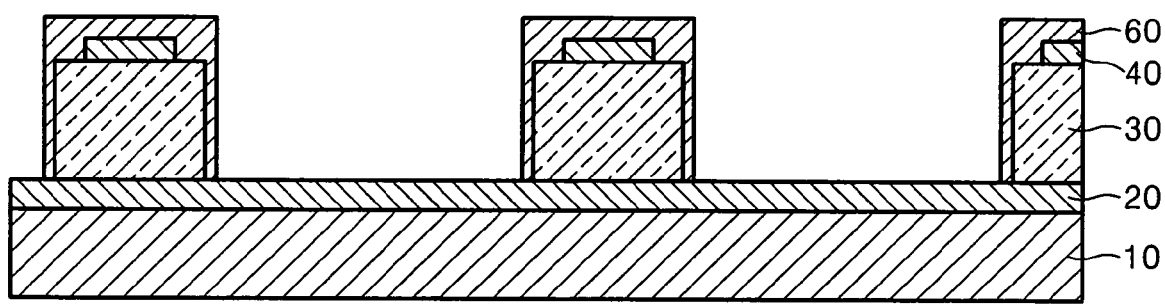
FIGS. 5A through 5F are process diagrams illustrating a method of manufacturing a field emission device according to a second embodiment of the present invention.

As shown in FIG. 5A, a sacrificial layer 60 for achieving lift-off is formed of a photoresist on a surface of the gate electrode 40 and on an inner wall of the through hole 30a other than the bottom of the through hole 30a. The sacrificial layer 60 is formed by screen printing using a paste or by spin coating using a Sol-gel or a slurry solution and is soft-baked.

Figure 5B:
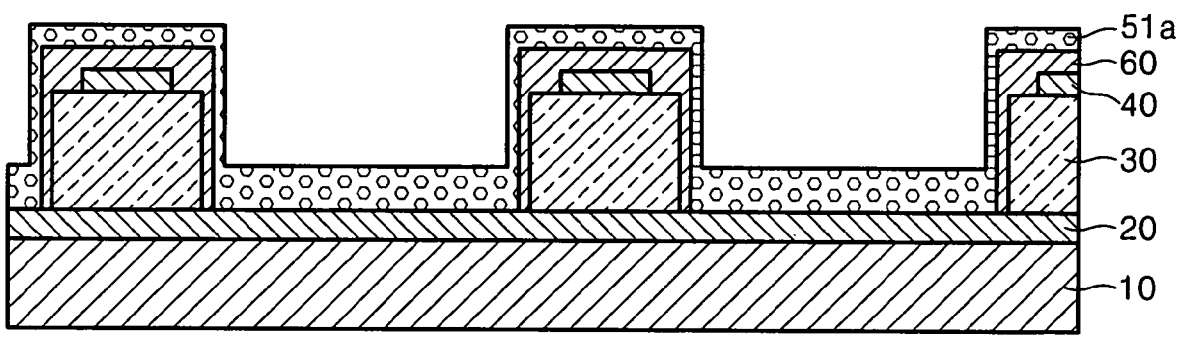

As shown in FIG. 5B, a resistive material layer 51a is formed on the sacrificial layer 60. Here, the resistive material layer 51a does not react to at least one of the sacrificial layer 60 and an electron emission material formed on the sacrificial layer 60. Like the sacrificial layer 60, the resistive material layer 51a is formed by screen printing using a paste or by spin coating using a Sol-gel or a slurry solution and is soft-baked. Here, a material used to form the resistive material layer 51a does not react to the sacrificial layer 60 or has a very week reactivity that does not disturb this process. Preferably, this nonreactivity is maintained at the electron emission material which will be formed on the resistive material layer 51a. Also, preferably, a resistive material or a photoimageable resin is contained in the resistive material layer 51a so as to form a resistive material layer under the emitter. Here, SiO2, MgO, a-Si, or p-Si or at least one of them may be used as the resistive material.

Figure 5C:
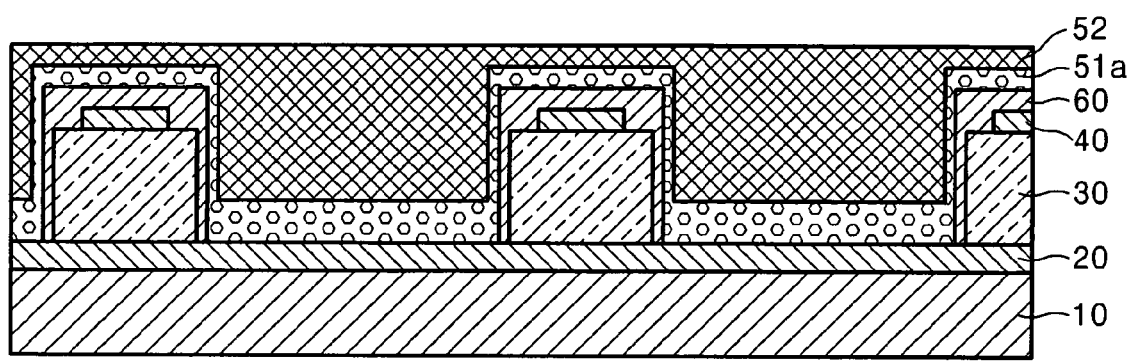

As shown in FIG. 5C, an electron emission material layer 52 in a paste state containing a photoimageable resin and a material where electron emission can be achieved, for example, CNT or nano particles, is formed on the resistive material layer 51a. Preferably, conductive particles for effective current supply, for example, silver (Ag) is contained in the paste. The electron emission material layer 52 may be formed by screen printing using a paste or by spin coating using a Sol-gel or a slurry solution.

Figure 5D:
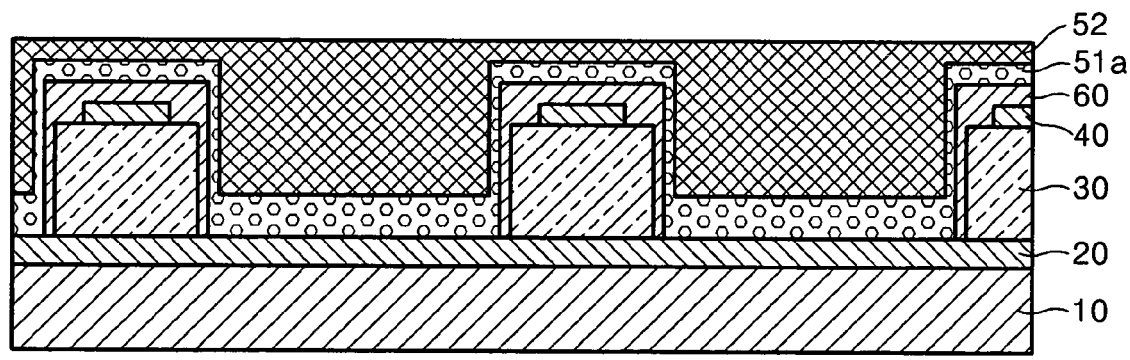
Figure 5D:
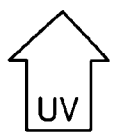

As shown in FIG. 5D, the sacrificial layer 60, the resistive material layer 51a, and the electron emission material layer 50 are cured by heating or using ultraviolet (UV) rays.

Figure 5E:
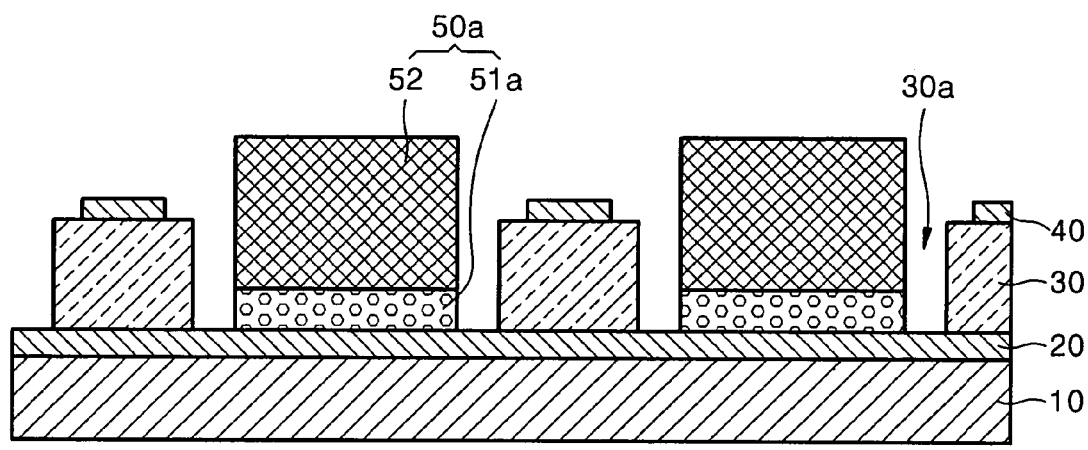

As shown in FIG. 5E, lift-off of removing the sacrificial layer 60 is performed using an etchant, and thus, an initial-shaped emitter 50a is formed by the resistive material layer 51a and the electron emission material layer 52 only in the bottom center of the through hole 30a.

Figure 5F:
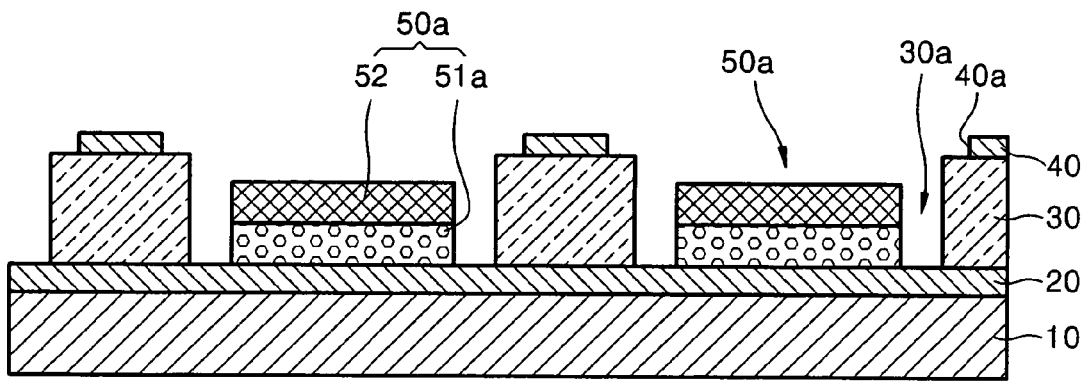

As shown in FIG. 5F, the emitter 50a is fired at a predetermined temperature, completely cured, and contracted. Thus, an upper end of the emitter 50a is gone down to a lower portion of the gate hole 40a. By firing all of thermal dissoluble components are removed from a stack formed on the substrate structure.

As described above, the second embodiment of the present invention is characteristic in that the nonreactive resistive material layer is interposed between the sacrificial layer and the electron emission material such that reaction between the sacrificial layer containing the photoresist and the electron emission material layer, a strong combination thereof is prevented, and thus, lift-off can be effectively performed. Also, due to the resistive material layer, current is uniformly supplied to the electron emission material layer with a high conductivity and thus, electrons can be uniformly emitted to the entire area of the emitter.

In the second embodiment, the resistive material layer does not react to the sacrificial layer and the electron emission material layer, but in the following third and fourth embodiments, an additional isolation layer is inserted in a stack formed between the sacrificial layer and the electron emission material layer that have not to react to each other, such that remaining of an unnecessary electron emission material can be prevented even after lift-off is performed.

Hereinafter, the method of manufacturing a field emission device according to a third embodiment of the present invention will be described stepwise. In the present embodiment, first, a substrate structure is prepared using the processes shown in FIGS. 3A through 3C, and the following processes are performed.

Figure 6A:
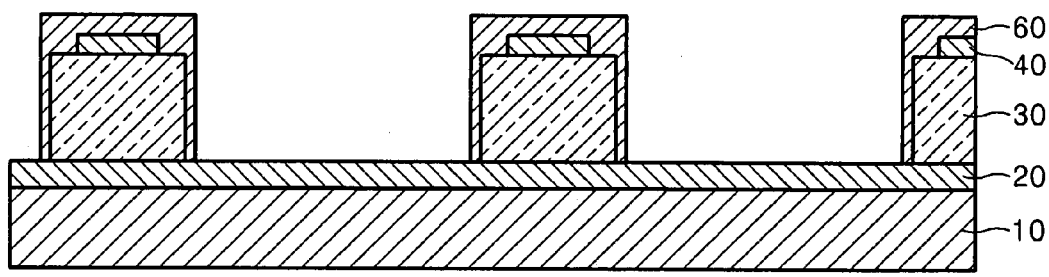
FIGS. 6A through 6G are process diagrams illustrating the method of manufacturing a field emission device according to a third embodiment of the present invention.

As shown in FIG. 6A, a sacrificial layer 60 for achieving lift-off is formed of a photoresist on a surface of the gate electrode 40 and on an inner wall of the through hole 30a other than the bottom of the through hole 30a. The sacrificial layer 60 is formed by screen printing using a paste or by spin coating using a Sol-gel or a slurry solution and is soft-baked.

Figure 6B:
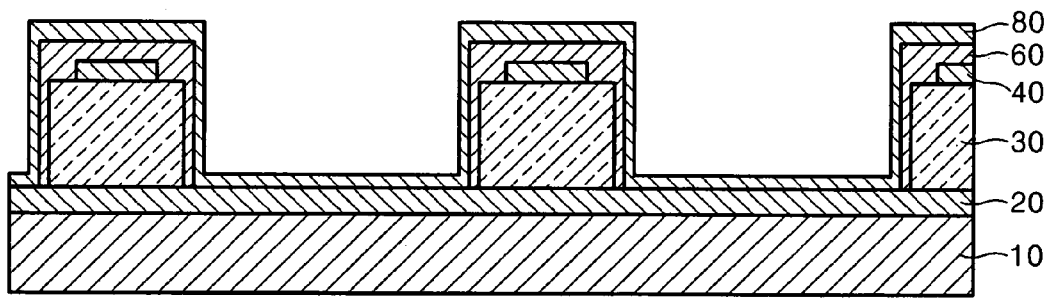

As shown in FIG. 6B, an isolation layer 80 that does not react to at least one of the sacrificial layer 60 and a resistive material layer 51 formed on the sacrificial layer 60 is formed on the sacrificial layer 60. The isolation layer 80 is formed by screen printing using a paste or by spin coating using a Sol-gel or a slurry solution and is soft-baked.

Figure 6C:
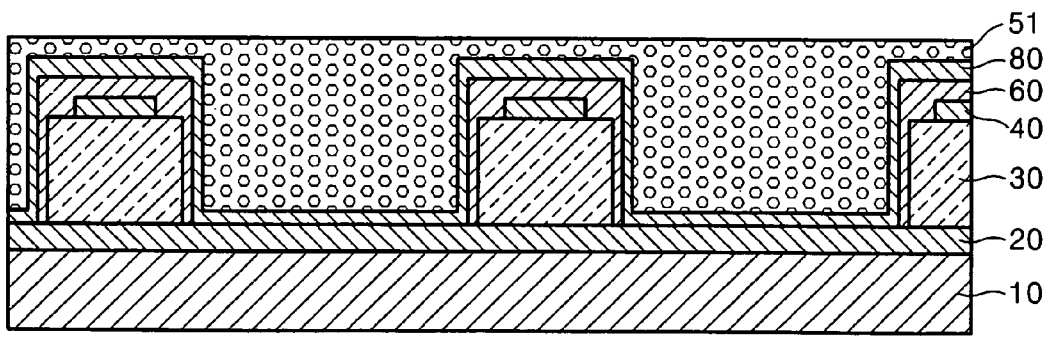

As shown in FIG. 6C, the resistive material layer 51 is formed on the isolation layer 80. The resistive material layer 51 is also formed by screen printing using a paste or by spin coating using a Sol-gel or a slurry solution and is soft-baked. Here, the resistive material layer 51 may include a photoimageable resin. Here, $SiO_2$, MgO, a-Si, or p-Si or at least one of them may be used as the resistive material.

Figure 6D:
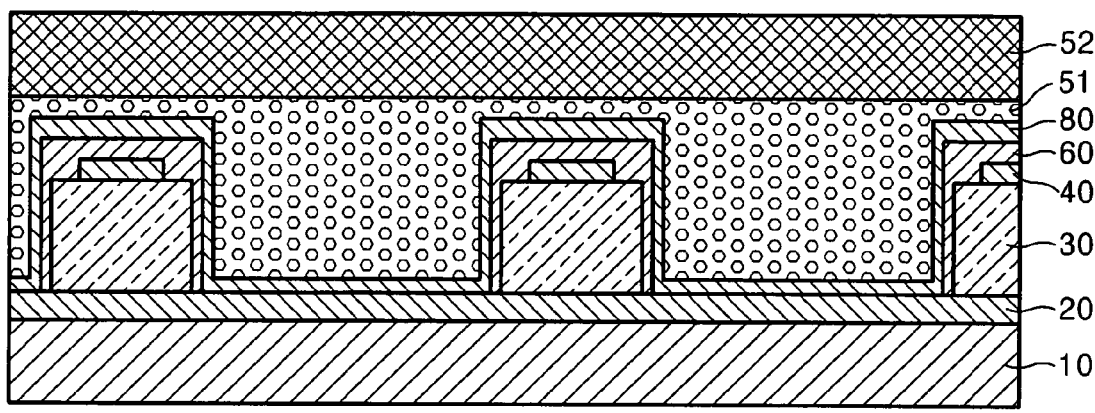

As shown in FIG. 6D, an electron emission material layer 52 containing a photoimageable resin and a material where electron emission can be achieved, for example, CNT or nano particles, is formed on the resistive material layer 51. Preferably, conductive particles for effective current supply, for example, silver (Ag) is contained in the paste. The electron emission material layer 52 may be formed by screen printing using a paste or by spin coating using a Sol-gel or a slurry solution.

Figure 6E:
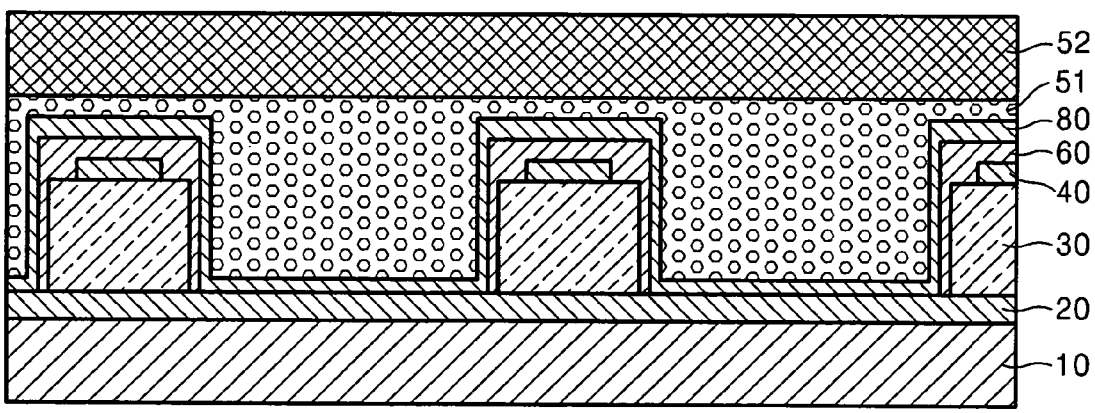
Figure 6E:

As shown in FIG. 6E, the sacrificial layer 60, the isolation layer 80, and the electron emission material layer 50 are cured by heating or using ultraviolet (UV) rays.

Figure 6F:
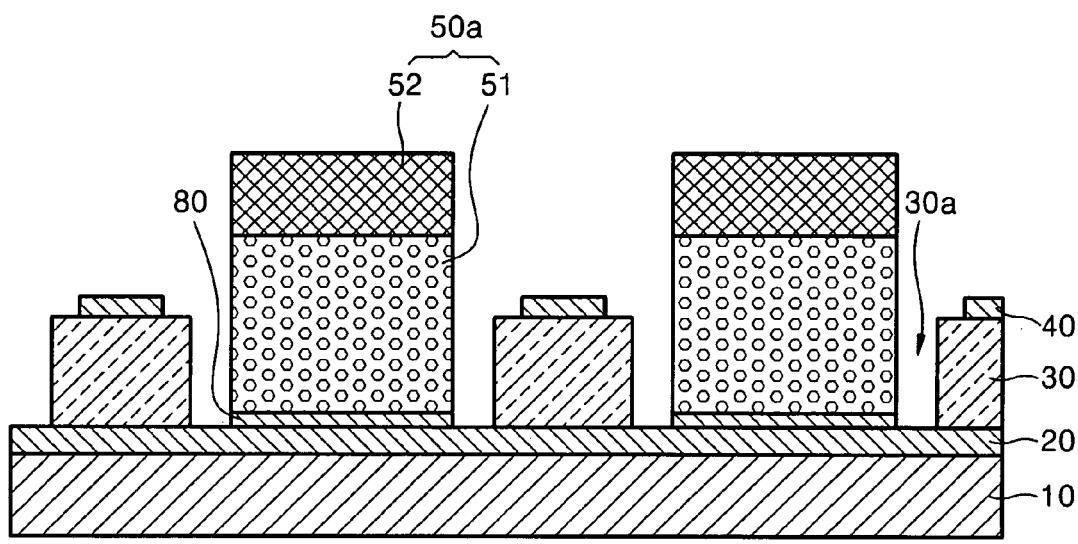

As shown in FIG. 6F, lift-off of removing the sacrificial layer 60 is performed using an etchant, and thus, an initial-shaped emitter 50 is formed by the isolation layer 80, the resistive material layer 51 formed on the isolation layer 80, and the electron emission material layer 52 in the bottom center of the through hole 30a.

Figure 6G:
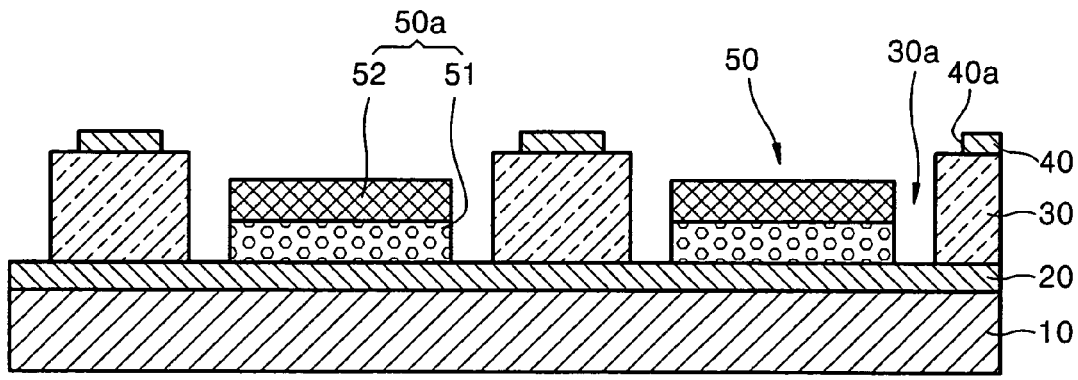

As shown in FIG. 6G, the emitter 50 is fired at a predetermined temperature, completely cured, and contracted. Thus, an upper end of the emitter 50 is gone down to a lower portion of the gate hole 40a. By firing all of thermal decomposable components, in particular, the isolation layer 80 is removed from a stack formed on the substrate structure.

Hereinafter, the method of manufacturing a field emission device according to a fourth embodiment of the present invention will be described stepwise. In the present embodiment, first, a substrate structure is prepared using the processes shown in FIGS. 3A through 3C, and the following processes are performed.

Figure 7A:
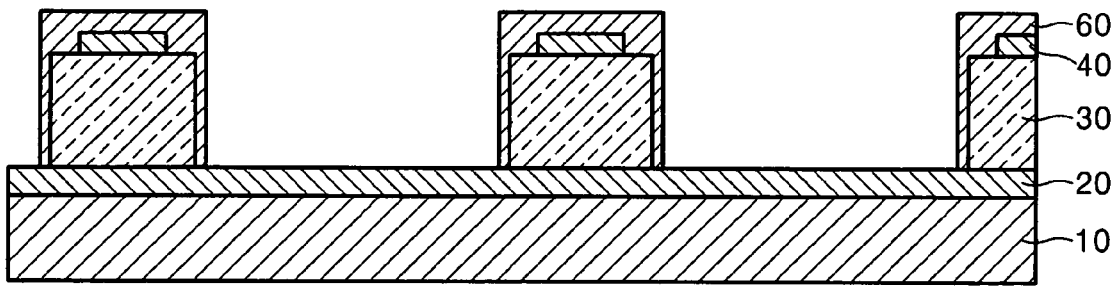
FIGS. 7A through 7G are process diagrams illustrating the method of manufacturing a field emission device according to a fourth embodiment of the present invention.

As shown in FIG. 7A, a sacrificial layer 60 for achieving lift-off is formed of a photoresist on a surface of the gate electrode 40 and on an inner wall of the through hole 30a other than the bottom of the through hole 30a. The sacrificial layer 60 is formed by screen printing using a paste or by spin coating using a Sol-gel or a slurry solution and is soft-baked.

Figure 7B:
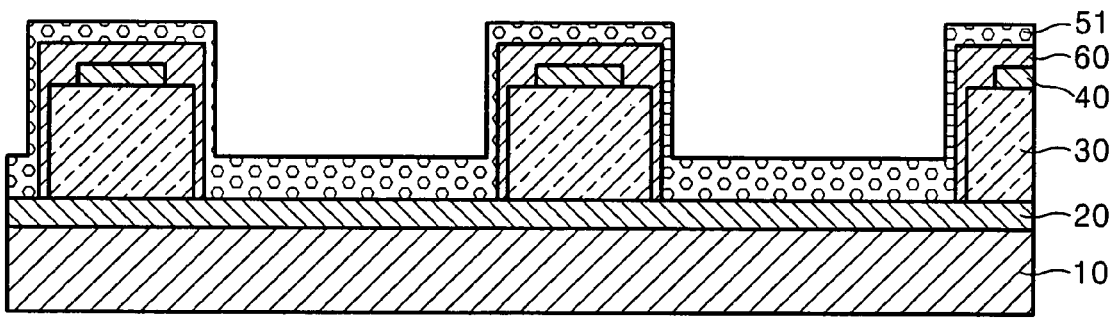

As shown in FIG. 7B, a resistive material layer 51 is formed on the sacrificial layer 60. The resistive material layer 51 is also formed by screen printing using a paste or by spin coating using a Sol-gel or a slurry solution and is soft-baked. Here, the resistive material layer 51 may include a photoimageable resin. Here, $SiO_2$, MgO, a-Si, or p-Si or at least one of them may be used as the resistive material.

Figure 7C:
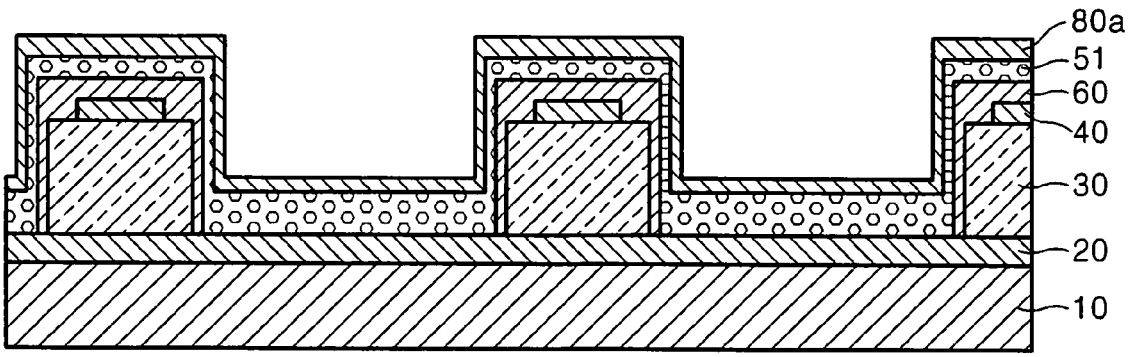

As shown in FIG. 7C, an isolation layer 80a that does not react to at least one of the sacrificial layer 60 and a resistive material layer 51 formed on the sacrificial layer 60 is formed on the sacrificial layer 60. The isolation layer 80a is formed by screen printing using a paste or by spin coating using a Sol-gel or a slurry solution and is soft-baked.

Figure 7D:
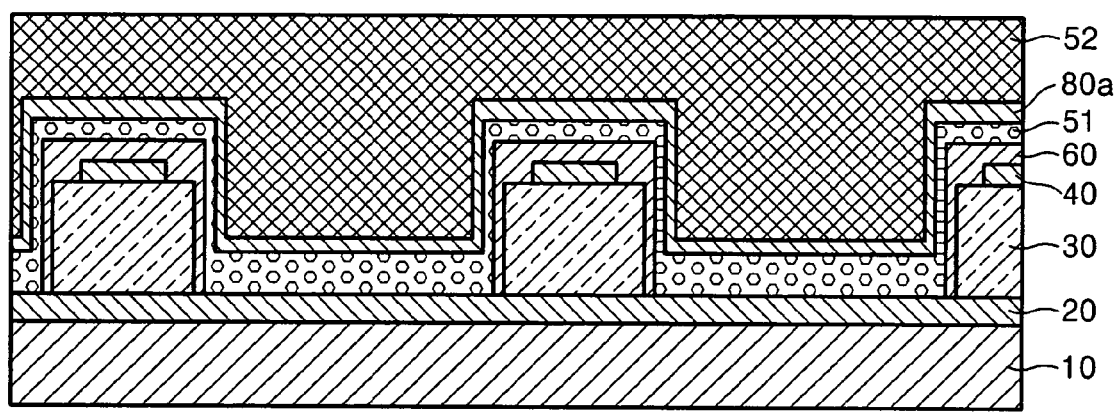

As shown in FIG. 7D, an electron emission material layer 52 containing a photoimageable resin and a material where electron emission can be achieved, for example, CNT or nano particles, is formed on the isolation layer 80a. Preferably, conductive particles for effective current supply, for example, silver (Ag) is contained in the paste. The electron emission material layer 52 may be formed by screen printing using a paste or by spin coating using a Sol-gel or a slurry solution.

Figure 7E:
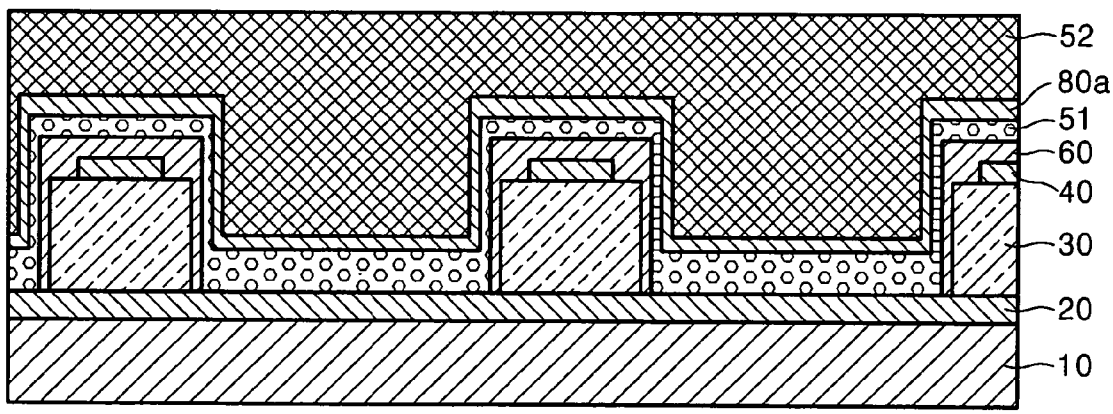
Figure 7E:
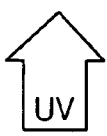

As shown in FIG. 7E, the sacrificial layer 60, the isolation layer 80a, the resistive material layer 51a, and the electron emission material layer 50 are cured by heating or using ultraviolet (UV) rays.

Figure 7F:
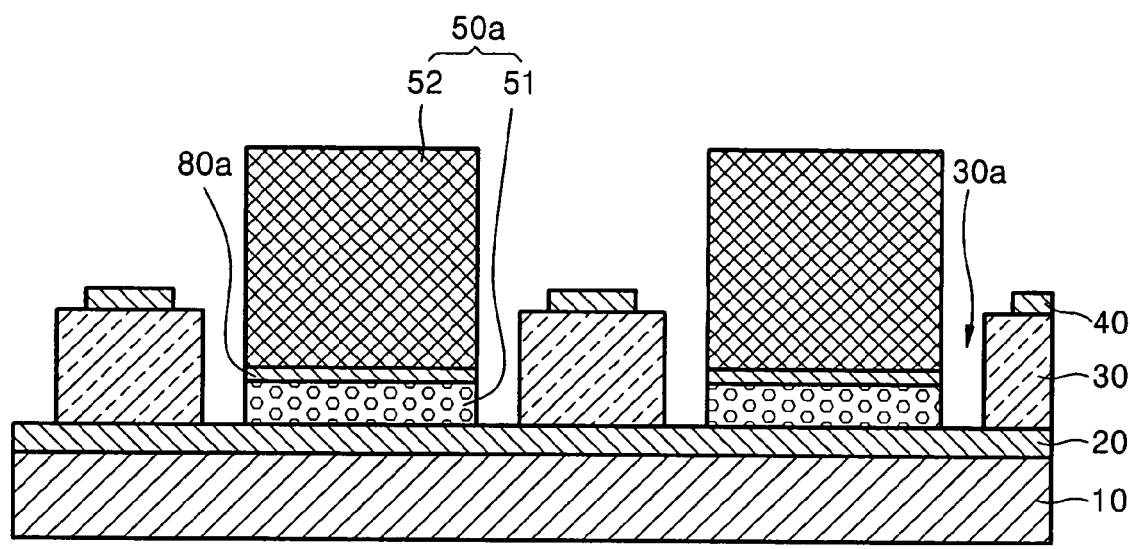

As shown in FIG. 7F, lift-off of removing the sacrificial layer 60 is performed using an etchant, and thus, an initial-shaped emitter 50a is formed by the resistive layer 51, the isolation layer 80a formed on the resistive layer 51, and the electron emission material layer 52 in the bottom center of the through hole 30a.

Figure 7G:
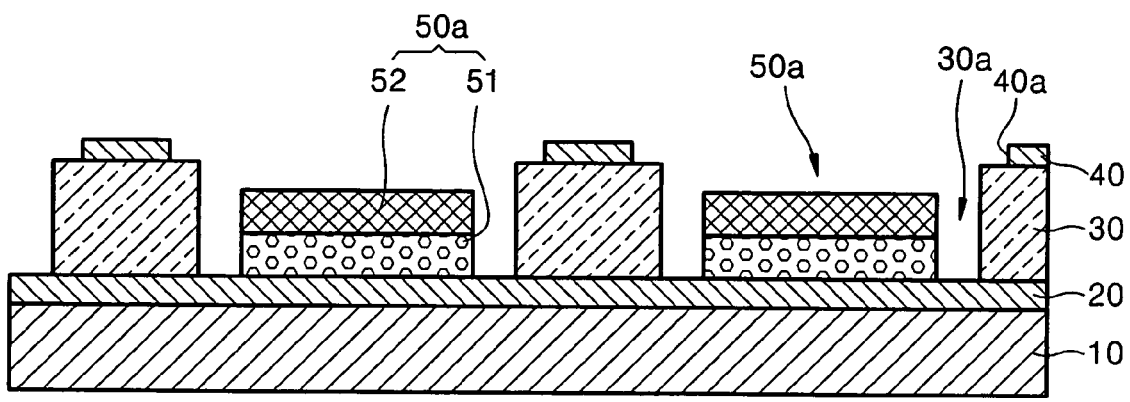

As shown in FIG. 7G, the emitter 50a is fired at a predetermined temperature, completely cured, and contracted. Thus, an upper end of the emitter 50a is gone down to a lower portion of the gate hole 40a. By firing all of thermal decomposable components, in particular, the isolation layer 80a is removed from a stack formed on the substrate structure.

As described above, according to the present invention, a resistive material layer is formed under an electron emission material layer such that current is uniformly supplied to emission points of CNT or nano particles uniformly distributed over the electron emission material layer with a high conductivity, partial overcurrent is not generated, and the life span of the field emission device is increased.

In addition, by adopting the resistive material layer formed by a nonreactive material electrons of high current are emitted and thus, a field emission device with a high luminance can be manufactured. In addition, due to the nonreactive material, lift-off is effectively performed such that short circuit between a gate electrode and an emitter can be prevented and a field emission device without defects can be manufactured.

While this invention has been particularly shown and described with reference to preferred embodiments thereof, it will be understood by those skilled in the art that various changes in form and details may be made therein without departing from the spirit and scope thereof as defined by the appended claims.

What is claimed is:

1. A method of manufacturing a field emission device, the method comprising:
   (a) preparing a substrate structure in which a cathode electrode formed on a substrate, a gate insulating layer having a through hole through which part of the cathode electrode is exposed formed on the cathode electrode, and a gate electrode having a gate hole corresponding to the through hole formed on the gate insulating layer are sequentially stacked;
   (b) forming a sacrificial layer on the surface of the substrate structure and on an inner wall of the through hole other than the cathode electrode exposed to the bottom of the through hole;
   (c) coating a resistive material on the surface of the substrate structure to a predetermined thickness, covering the through hole with the resistive material, and forming an electron emission material layer on the resistive material layer;
   (d) performing lift-off for removing the sacrificial layer formed on the surface of the gate electrode and on an inner wall of the through hole using an etchant and forming an emitter formed of the resistive material layer and the electron emission material layer formed on the resistive material layer in an inner portion of the through hole; and
   (e) firing the emitter.

2. The method of claim 1, wherein the resistive material layer is formed of one of a paste, a Sol-gel, or a slurry solution.

3. The method of claim 2, wherein the resistive material layer is formed of one of a paste, a Sol-gel, or a slurry solution.

4. The method of claim 3, wherein the resistive material contains one or mixture of $SiO_2$, MgO, a-Si, p-Si.

5. The method of claim 1, wherein the electron emission material layer includes a conductive material and is formed of one of a paste, a Sol-gel, or a slurry solution.

6. The method of claim 5, wherein the conductive material is silver (Ag).

7. The method of claim 1, wherein the electron emission material layer and the resistive material layer include a photoimageable resin.

8. A method of manufacturing a field emission device, the method comprising:
   (a) preparing a substrate structure in which a cathode electrode formed on a substrate, a gate insulating layer having a through hole through which part of the cathode electrode is exposed formed on the cathode electrode, and a gate electrode having a gate hole corresponding to the through hole formed on the gate insulating layer are sequentially stacked;
   (b) forming a sacrificial layer on the surface of the substrate structure and on an inner wall of the through hole other than the cathode electrode exposed to the bottom of the through hole;
   (c) forming a resistive material layer that prevents contact between an electron emission material layer used to form an emitter on the gate electrode and the sacrificial layer and does not react to at least one of the sacrificial layer and the electron emission material layer;
   (d) coating the electron emission material on the surface of the substrate structure on which the sacrificial layer is formed, to a predetermined thickness and forming an electron emission material layer for covering the through hole with the electron emission material;
   (e) performing lift-off for removing the sacrificial layer formed on the surface of the gate electrode and on an inner wall of the through hole using an etchant, removing the resistive material layer formed on the sacrificial layer and the electron emission material, and forming an emitter formed of the resistive material layer and the electron emission material layer in an inner portion of the through hole; and
   (f) firing the emitter.

9. The method of claim 8, wherein the electron emission material includes one of carbon nanotubes or nano particles.

10. The method of claim 8, wherein the electron emission material layer includes a conductive material.

11. The method of claim 10, wherein the conductive material includes silver (Ag).

12. The method of claim 8, wherein the resistive material layer includes at least one of $SiO_2$, MgO, a-Si, and p-Si.

13. The method of claim 8, wherein the resistive material layer is formed of one of a paste, a Sol-gel, or a slurry solution.

14. The method of claim 8, wherein the electron emission material layer includes a conductive material and is formed of one of a paste, a Sol-gel, or a slurry solution.

15. The method of claim 14, wherein the conductive material is silver (Ag).

16. The method of claim 8, wherein the electron emission material layer and the resistive material layer include a photoimageable resin.

17. The method of claim 8, wherein the resistive material layer is formed using a solution where polyvinyl alcohol is added to an IPA diluted solution $IPA/H_2O$.

18. A method of manufacturing a field emission device, the method comprising:
   (a) preparing a substrate structure in which a cathode electrode formed on a substrate, a gate insulating layer having a through hole through which part of the cathode electrode is exposed formed on the cathode electrode, and a gate electrode having a gate hole corresponding to the through hole formed on the gate insulating layer are sequentially stacked;
   (b) forming a sacrificial layer on the surface of the substrate structure and on an inner wall of the through hole other than the cathode electrode exposed to the bottom of the through hole;
   (c) forming an isolation layer that isolates the sacrificial layer and a resistive material layer formed on the sacrificial layer from each other and does not react to at least one of the sacrificial layer and the resistive material layer;
   (d) forming the resistive material layer having an electrical resistivity on the isolation layer;
   (e) coating an electron emission material on the surface of the substrate structure on which the isolation layer is formed, to a predetermined thickness and forming an electron emission material layer for covering the through hole with the electron emission material;

(f) performing lift-off for removing the sacrificial layer formed on the surface of the gate electrode and on an inner wall of the through hole using an etchant, removing the isolation layer formed on the sacrificial layer, the resistive material layer, and the electron emission material, and forming an emitter formed of the resistive material layer and the electron emission material layer in an inner portion of the through hole; and (g) firing the emitter.

19. The method of claim 18, wherein the electron emission material includes one of carbon nanotubes or nano particles.

20. The method of claim 18, wherein the electron emission material layer includes a conductive material.

21. The method of claim 20, wherein the conductive material includes silver (Ag).

22. The method of claim 18, wherein the resistive material layer includes at least one of $SiO_2$, MgO, a-Si, and p-Si.

23. The method of claim 18, wherein the resistive material layer is formed of one of a paste, a Sol-gel, or a slurry solution.

24. The method of claim 18, wherein the electron emission material layer includes a conductive material and is formed of one of a paste, a Sol-gel, or a slurry solution.

25. The method of claim 24, wherein the conductive material is silver (Ag).

26. The method of claim 18, wherein the electron emission material layer and the resistive material layer include a photoimageable resin.

27. The method of claim 18, wherein the isolation layer is formed using a solution where polyvinyl alcohol is added to an IPA diluted solution IPA/$H_2O$.

28. A method of manufacturing a field emission device, the method comprising:

(a) preparing a substrate structure in which a cathode electrode formed on a substrate, a gate insulating layer having a through hole through which part of the cathode electrode is exposed formed on the cathode electrode, and a gate electrode having a gate hole corresponding to the through hole formed on the gate insulating layer are sequentially stacked;

(b) forming a sacrificial layer on the surface of the substrate structure and on an inner wall of the through hole other than the cathode electrode exposed to the bottom of the through hole;

(c) forming a resistive material layer having an electrical resistivity on the sacrificial layer;

(d) forming an isolation layer that isolates the resistive material layer and an electron emission material layer formed on the resistive material layer from each other and does not react to at least one of the resistive material layer and the electron emission material layer;

(e) coating an electron emission material on the surface of the substrate structure on which the isolation layer is formed, to a predetermined thickness and forming an electron emission material layer for covering the through hole with the electron emission material;

(f) performing lift-off for removing the sacrificial layer formed on the surface of the gate electrode and on an inner wall of the through hole using an etchant, removing the resistive material layer formed on the sacrificial layer, the isolation layer, and the electron emission material, and forming an emitter formed of the resistive material layer and the electron emission material layer in an inner portion of the through hole; and (g) firing the emitter.

29. The method of claim 28, wherein the electron emission material includes one of carbon nanotubes or nano particles.

30. The method of claim 28, wherein the electron emission material layer includes a conductive material.

31. The method of claim 30, wherein the conductive material includes silver (Ag).

32. The method of claim 28, wherein the resistive material layer includes at least one of $SiO_2$, MgO, a-Si, and p-Si.

33. The method of claim 28, wherein the resistive material layer is formed of one of a paste, a Sol-gel, or a slurry solution.

34. The method of claim 28, wherein the electron emission material layer includes a conductive material and is formed of one of a paste, a Sol-gel, or a slurry solution.

35. The method of claim 34, wherein the conductive material is silver (Ag).

36. The method of claim 28, wherein the electron emission material layer and the resistive material layer include a photoimageable resin.

37. The method of claim 28, wherein the isolation layer is formed using a solution where polyvinyl alcohol is added to an IPA diluted solution IPA/$H_2O$.

* * * * *